United States Patent
Lyons et al.

(10) Patent No.: US 9,361,718 B2
(45) Date of Patent: Jun. 7, 2016

(54) INTERACTIVE SCREEN VIEWING

(75) Inventors: Kenton M. Lyons, Santa Clara, CA (US); Joshua J. Ratcliff, San Jose, CA (US); Horst W. Hausseeker, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 32 days.

(21) Appl. No.: 13/993,268

(22) PCT Filed: Sep. 8, 2011

(86) PCT No.: PCT/US2011/050893
§ 371 (c)(1),
(2), (4) Date: Jun. 11, 2013

(87) PCT Pub. No.: WO2013/036236
PCT Pub. Date: Mar. 14, 2013

(65) Prior Publication Data
US 2013/0271454 A1    Oct. 17, 2013

(51) Int. Cl.
*G09G 5/00* (2006.01)
*G06T 15/00* (2011.01)
*G06T 11/60* (2006.01)
*G06F 3/0489* (2013.01)
(Continued)

(52) U.S. Cl.
CPC .............. *G06T 11/60* (2013.01); *G06F 3/013* (2013.01); *G06F 3/04897* (2013.01); *G06F 3/0481* (2013.01); *G06F 9/4443* (2013.01); *G06T 11/00* (2013.01); *G06T 19/00* (2013.01); *G09G 5/00* (2013.01); *G09G 2320/0606* (2013.01); *G09G 2320/066* (2013.01); *G09G 2320/0686* (2013.01); *G09G 2340/0407* (2013.01); *G09G 2340/14* (2013.01); *G09G 2354/00* (2013.01)

(58) Field of Classification Search
CPC ......... G06T 19/00; G06T 17/20; G06T 17/00; G06T 15/10; G06T 15/00; G06T 11/60; G06T 11/00; G06F 9/4443; G06F 3/0481
USPC .......... 345/156, 619, 649, 660, 786; 382/220, 382/103, 195
See application file for complete search history.

(56) References Cited

U.S. PATENT DOCUMENTS 6,795,806 B1 * 9/2004 Lewis .................... G06F 3/167
704/260
6,985,158 B2    1/2006 Miller
(Continued)

FOREIGN PATENT DOCUMENTS

JP    2008071162 A    10/2009
WO    2005010739 A1    2/2005

OTHER PUBLICATIONS

Office Action dated Apr. 15, 2014 by the European Patent Office in Application No. 11872012.7-1903 (3 pages).
(Continued)

*Primary Examiner* — Abderrahim Merouan
(74) *Attorney, Agent, or Firm* — Trop Pruner & Hu, P.C.

(57) ABSTRACT

The presentation of a computer display may be modified based on what the user is viewing on the display. In one embodiment, gaze detection technology may be used to determine what the user is looking at. Based on what the user is looking at, the display may be altered to either improve or degrade the display at the region the user is looking at.

28 Claims, 3 Drawing Sheets

(51) Int. Cl.
   *G06F 3/01*   (2006.01)
   *G06T 11/00*   (2006.01)
   *G06F 3/0481*   (2013.01)
   *G06F 9/44*   (2006.01)
   *G06T 19/00*   (2011.01)

(56) References Cited

U.S. PATENT DOCUMENTS

| | | | |
|---|---|---|---|
| 7,501,995 | B2 | 3/2009 | Morita |
| 8,120,577 | B2 * | 2/2012 | Bouvin et al. .................. 345/157 |
| 8,564,533 | B2 * | 10/2013 | Yuan .................. G06F 3/013 345/156 |
| 2003/0020755 | A1 * | 1/2003 | Lemelson .............. G06F 3/013 715/786 |
| 2006/0038880 | A1 * | 2/2006 | Starkweather et al. .......... 348/51 |
| 2006/0109237 | A1 * | 5/2006 | Morita et al. .................. 345/156 |
| 2007/0011609 | A1 * | 1/2007 | Adjouadi et al. .............. 715/700 |
| 2008/0062383 | A1 * | 3/2008 | Endrikhovski et al. ....... 351/209 |
| 2009/0237644 | A1 | 9/2009 | Uechi |
| 2010/0103194 | A1 * | 4/2010 | Chen et al. .................... 345/629 |
| 2010/0231504 | A1 * | 9/2010 | Bloem ................... G06F 3/013 345/156 |
| 2011/0010266 | A1 * | 1/2011 | Edwards ...................... 705/26.8 |
| 2011/0096187 | A1 * | 4/2011 | Steinberg et al. ........... 348/222.1 |
| 2011/0128412 | A1 * | 6/2011 | Milnes et al. ............ 348/231.99 |
| 2011/0206283 | A1 * | 8/2011 | Quarfordt et al. ............ 382/220 |
| 2011/0246513 | A1 * | 10/2011 | Covannon et al. ............ 707/769 |
| 2012/0069235 | A1 * | 3/2012 | Imai ........................ 348/333.11 |

OTHER PUBLICATIONS

International Preliminary Report on Patentability dated Mar. 20, 2014, issued in PCT/US2011/050893 (2 pages).
Written Opinion of International Searching Authority dated Mar. 26, 2014, issued in PCT/US2011/050893 (5 pages).
European Supplementary Partial EP Search Report dated Mar. 13, 2015 in corresponding EP patent application EP11872012 (6 pages).
Korean IP office issued Notice of Final Rejection issued by KIPO on Jan. 14, 2016 to corresponding KR application No. 10-2014-700619, (8 pages) [w/English translation].

* cited by examiner

INTERACTIVE SCREEN VIEWING

BACKGROUND

This relates generally to computer systems and, particularly, to displays and graphics processing for those computer systems.

Typically, a computer system can display a variety of different images. For example, it may display text, pictures, such as still images or video images, or it can display animated graphics, to mention some examples.

Taking still photographs, as an example, generally, a plurality of settings are used to capture the image. Once these settings have been made by the person capturing the image, the nature of the resulting depiction is fixed. In some cases, post-processing may be applied to change the depiction across the image. For example, contrast enhancements may be applied, illumination variations may be made, and other changes may be made in the completed picture.

DETAILED DESCRIPTION

In accordance with some embodiments of the present invention, the depiction of any type of computer displayed image may be varied locally after the image has already been displayed. In some embodiments, the local variation may be the result of the user selection of particular regions within the overall depiction. These regions may then be redisplayed to enhance their characteristics. For example, when the user looks at a particular region of a computer depiction, various characteristics of that region may be adjusted, including resolution, depth of focus, exposure, and parallax, as examples. As a result, the image may be enhanced locally in the areas of current interest.

In many cases, it is impossible to optimize all the adjustable characteristics of any computer display depiction across the image. Objects depicted in different regions of the image may be different distances from the image capture device (or point of view of a graphical depiction) and, thus, may be more or less out of focus. The parallax may be different across the depiction, based on the way the depiction was captured. Similarly, the illumination may be affected by various local lighting effects. Finally, exposure may be different at different places in the depiction.

Thus, it may be advantageous to enable selective enhancement within regions of greater current interest. This may be done by determining what regions are of interest to the user, for example, by user selections through input/output devices, or by determining, using gaze detection, what the user is actually looking at. Then these regions may be re-rendered to enhance various characteristics as desired by the user. This may happen automatically in some embodiments.

Figure 1:
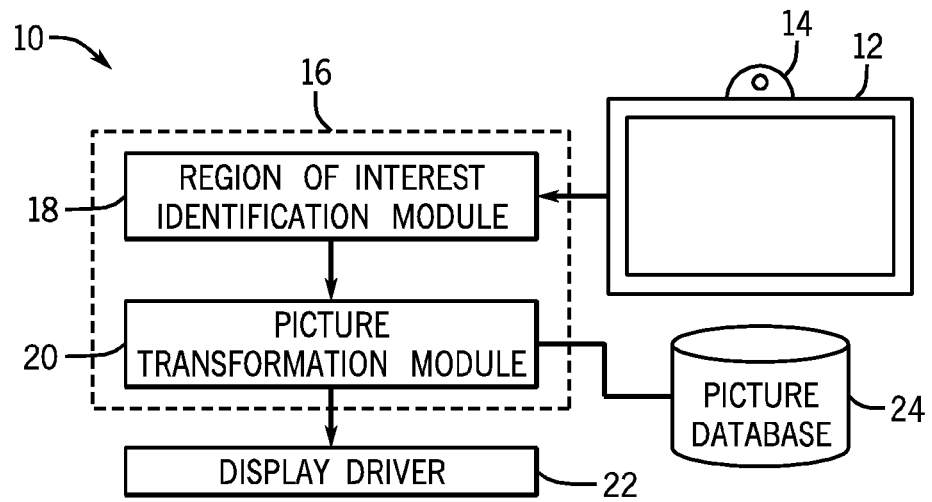
FIG. 1 is a system depiction for one embodiment of the present invention.

Referring to FIG. 1, a computer system 10 may include a display 12 with a camera 14 mounted thereon. The computer system 10 may be a fixed or wired system, such as a desktop computer or a mobile or battery powered system, such as a laptop, a mobile Internet device, a cell phone, a television, an imaging device, or an entertainment system, as examples.

In some embodiments, the camera 14 is a video camera used for user gaze detection. As used herein, "gaze detection" means to determine which portion of the display 12 the user is looking at, at any instance of time. "Gaze detection" encompasses head, face, and/or eye tracking. The gaze detection system may also include infrared light sources that illuminate the user's eye with infrared light. This illumination creates a "red eye" effect that may improve eye tracking. On axis infrared light sources, positioned closed to the camera 14, may be used. Also, off axis light sources, spaced away from the camera, can be used instead. The display 14 may be coupled to a processor 16, which includes a region of interest identification module 18 that uses the input from the gaze detector, in one embodiment, to determine what region of the display the user is looking at.

The region of interest identification module 18 may be implemented with hardware, software, or firmware. In addition to using gaze detection or, as alternatives thereto, user inputs may be received in the form of cursor inputs or, in the case where the display 12 is a touch screen, based on user contact with the display screen. Other ways of indicating regions of interest may also be applied.

The region of interest identification module 18 is coupled to an image transformation module 20, also included within the processor 16, in one embodiment. The module 20 may transform still or moving images or animations, as examples. The photo transformation module 20 may rely on a database of pictures 24 to transform regions of interest in one embodiment. The region of interest may be transformed in terms of exposure, depth of field, parallax, resolution, or any other characteristic. In some embodiments, the database 24 may include a number of depictions of the same scene captured with varied characteristics. For example, any one or more of exposure, depth of field, parallax, illumination, or resolution may be varied and, thus, regions of particular interest may have their characteristics adjusted by selecting different versions of the depiction in the picture database 24. The transformed image may then be driven to a display driver 22, in turn, provided to the display 12 for modifying the current display.

In some embodiments, the nature of the changes that are applied to the region of interest may be preprogrammed. Thus, a user may program exactly what characteristics may be varied at the region of interest. In addition, the user can provide real time commands to indicate how the user wants a particular region of interest to be changed. These may be provided by any input device and may be even indicated by voice commands or gestural commands, to give additional examples.

As still another alternative, the system may determine which of the characteristics may be enhanced in a particular region. The system may enhance any and all of those enhanceable characteristics automatically, in some embodiments.

Figure 2:
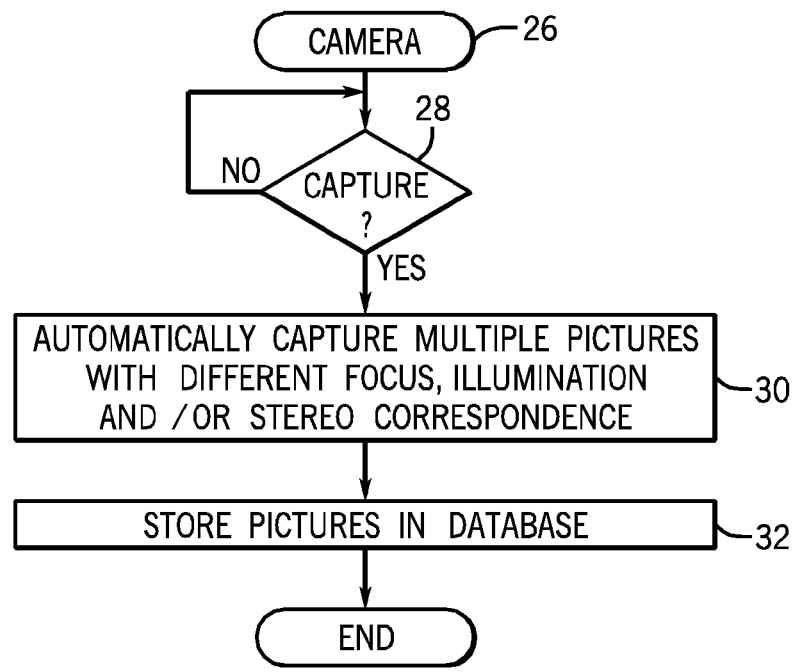
FIG. 2 is a flow chart for a camera in accordance with one embodiment of the present invention.

Referring to FIG. 2, a sequence 26 may be implemented by a processor-based system 10 including a camera 14. Thus, the processor-based system may be a still or video camera, or any type of computer that has imaging capabilities. It may be implemented in hardware, software, and/or firmware. In software and firmware embodiments, the sequence may be implemented by computer readable instructions stored on a non-transitory computer readable medium, such as a semiconductor, magnetic, or optical storage medium.

The sequence may begin, in some embodiments, by determining whether a command has been received to capture an image, such as a frame or sequence of frames, that make up a movie, as indicated in diamond 28. If so, multiple pictures may be automatically captured with different focus, illumination and/or stereo correspondence, among other characteristics, as indicated at block 30. Then these pictures may be stored in the database 24, as indicated in block 32. In some embodiments, the pictures may be organized or labeled in a way so that it is known which pictures correspond to which effects.

Figure 3:
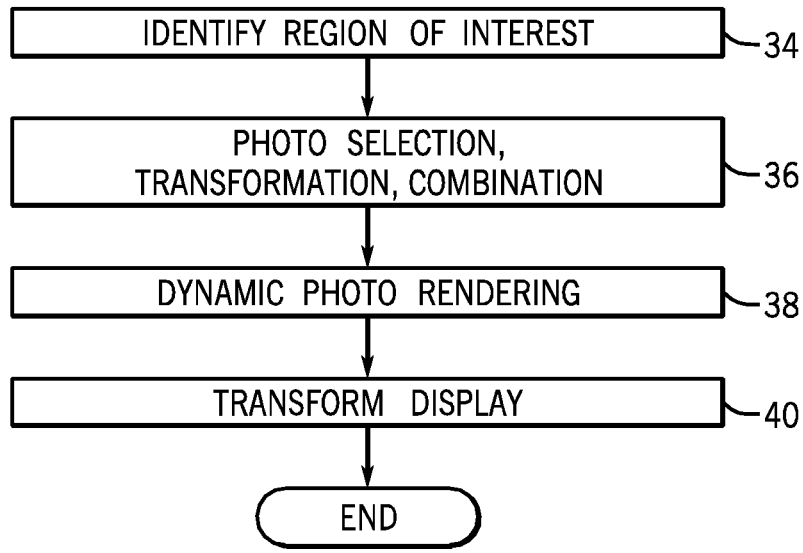
FIG. 3 is a flow chart for an image display system in accordance with one embodiment of the present invention.

Turning next to FIG. 3, a computer controlled display is demonstrated by a sequence that may be implemented in software, hardware, and/or firmware. In software and firmware applications, the sequence may be implemented by instructions stored on a non-transitory computer readable media.

Initially, a region of interest is identified, as indicated in diamond 34. Again, the region of interest may be identified in a number of different ways, including receiving a user input from a gaze detection module, a user touch screen input, or a cursor input, to mention a few examples.

In some cases, a region of interest may be determined using some preprogrammed sequence. For example, it may be desired to have the user look at various regions within the display. Thus, the regions of interest may be governed by the content or by some pattern which the system has been programmed to implement. Thus, the user may be led through the depiction on the screen from region to region, in some embodiments. For example, the depiction may be varied to encourage the user to look at the picture in a given way. Conversely, the depiction may be varied to draw the viewer's attention away from some object in the scene that the user is looking at, for example, by degrading the appearance of that object. For example, the object may be blurred, while another object is depicted more sharply.

Then, in block 36, image selection, transformation, and combination may be achieved. This may be done by selecting images in the database that correspond to the desired enhancements and then combining those images into one picture displayed on the display 12.

In some embodiments, dynamic photo rendering may be used, as indicated in block 38. Dynamic rendering may involve the selection of captured frame or frames to replace the existing frame to change the appearance of an object that the user is looking at.

In one approach, different versions of the depiction may replace the current depiction in order to provide the desired effect at the area of user interest or focus. In another approach, the region of interest may be re-rendered using computer graphics techniques to provide the desired effect. For example, a mosaic of imaged objects may be provided to make up the overall scene. Each of these mosaics may be replaced with a modified computer rendered depiction. Also, combinations of computer rendered variations and variations produced by capturing different versions of the image with different camera settings may be combined in some embodiments. Finally, in block 40, the display is transformed to show the selected region with the desired enhancement.

In some embodiments, the variation of the scene, based on user gaze detection, may be implemented in a way to simulate the viewing of the scene relative to the way the naked eye works. This could mean simulating the way the naked eye works or deliberately providing an effect contrary to the way the naked eye works. As an example, when the user looks at a bright light, the brightness gradually diminishes as the eye adjusts and emits less light into the eye.

The human eye has a certain rate of accommodation. This same accommodation may be applied electronically to change the way the user sees the scene as the lighting within the scene changes. For example, as the user changes his or her focus to look at a bright light in the scene, the light may initially appear bright and then may be gradually dimmed, for example, using computer rendering techniques. The rate at which this happens may correspond to the rate that the naked eye accommodates the light or can occur in a rate different from that accommodation in order to produce desired effects.

While embodiments have been described in which the source of the depiction is an imaging device, such as a camera, in other embodiments the source may be any source of viewable media, including television sources, such as broadcast, cable, or satellite sources and digital media, such as DVD disks or other stored media. In one embodiment, using television, in response to what the user is looking at, the content that is sent to the user's receiver may be changed from the head end, for example. Thus, the variations described herein, based on gaze detection, may be implemented by sending different versions of the depiction from the head end in accordance with what the user's current focus is.

In some embodiments, the eye gaze detection may be less accurate. In such case, computer vision techniques may be utilized to enhance the operation of the system. As an example, suppose the user is looking at the head of a person depicted in the scene. But the eye gaze detection may make an error and may, in fact, determine that the focus is to a blank area close to, but not corresponding to, the imaged person's head. Computer content analysis may be provided to search the area proximate to the area located using eye tracking and to determine that the real focus must be to the user's head because generally people do not look at blank areas of the screen. Thus, in response to the eye tracker indication that the user's gaze is being focused on a blank area, the imaged scene may be searched to find proximate objects and to determine the more likely object of the user's gaze. In this way, the detected gaze direction may be adjusted using content analysis.

Figure 4:
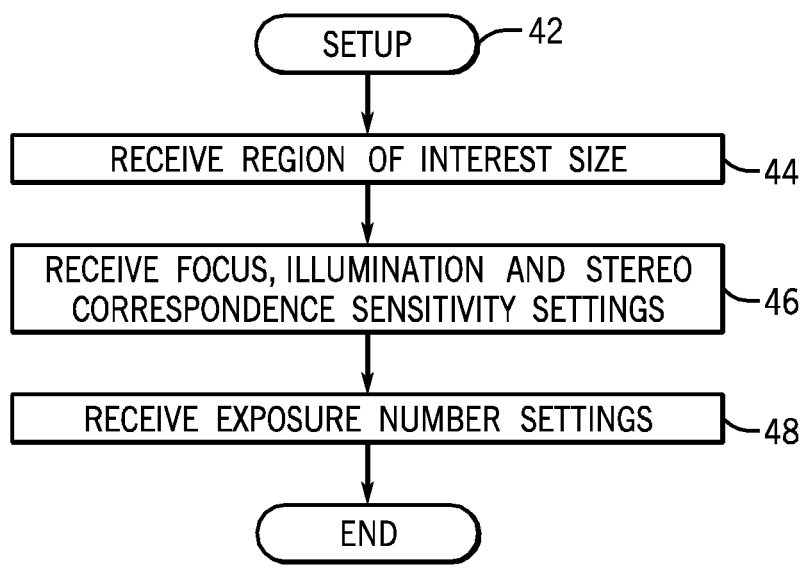
FIG. 4 is a set up sequence for the embodiment shown in FIG. 3 in accordance with one embodiment of the present invention.

The sequence of FIG. 3 may be enabled using the set up sequence 42, shown in FIG. 4, in one embodiment. Prior to actual use of the system, the sequence of FIG. 3 may be enabled by providing input data for that sequence. The set up sequence 42 may also be implemented in hardware, software, and/or firmware and the software and firmware embodiments may be implemented by computer executable instructions stored in a non-transitory computer readable medium.

Initially, at block 44, a selection of a region of interest size is received. Thus, the user can indicate that, when a particular area on the screen is identified, how big a surrounding area around the exact gaze target should be modified. Thus, a given geometric region, such as a circular, square, or rectangular region, centered around an input pixel, may be applied automatically, based on the user selection. Other inputs that may be received are the granularity of the focus, illumination, and stereo correspondence sensitivity settings. Thus, images may be captured at a series of increasing or decreasing resolution, focus, illumination, and stereo correspondence. The range between these settings or the amount of change between each successive captured images may be set by the user in block 46.

A number of exposure settings that will be recorded may be set by the user in block 48. All of this information may be stored in association with either the camera or the system 10, as the case may be. In some embodiments, the set up sequence may be implemented separately in the camera and the computer 10.

Figure 5:
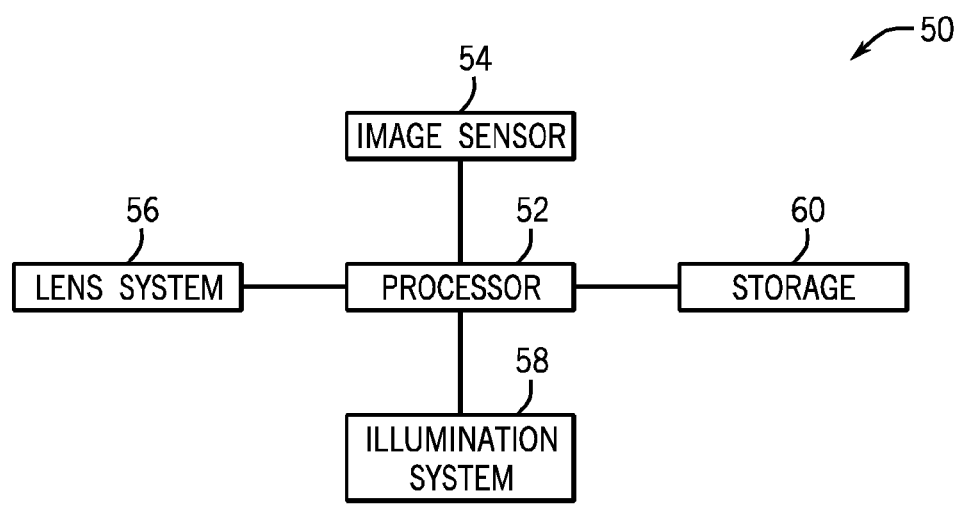
FIG. 5 is a schematic depiction of a camera in accordance with one embodiment of the present invention.

Finally, referring to FIG. 5, one example of a camera 14 is shown. In one embodiment, the camera 14 may be a plenoptic camera 50 that can take multiple pictures at different settings (i.e. focus depths) at the same time. Another embodiment may simply use focus bracketing to take a series of shots of the same scene with different camera settings. In still another embodiment, autobracketing may be used to automatically capture a series of shots of the same scene at different settings.

The camera 50 may include a processor 52, coupled to a storage 60. The storage 60 may receive data from the set up sequence 42 and may include the sequence 26 in software or firmware implemented embodiments. The processor 52 may execute such a sequence in one embodiment. Also coupled to the processor 52 is an image sensor 54 which may be used to actually capture still or moving images. A lens system 56 may be controlled by the processor 52. The lens system may automatically successively alter one or more of resolution, depth of field, or focus electronically by the processor 52 on each of a series of rapid exposures. Finally, the illumination system or lighting 58 may be adjusted dynamically by the processor 52.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   making an initial assessment of where on a display a user is looking using gaze technology;
   testing said initial assessment by determining whether the area the gaze detection technology indicates the user is looking at is blank;
   if the area is blank, searching proximate to said area to determine if there is a proximate object; and
   if so, correcting the initial assessment and identifying the proximate object as the object that the user is looking at and then altering resolution, depth of field or focus of that object.

2. The method of claim 1 including altering the presentation using a plurality of stored depictions of the same scene taken with different imaging device settings.

3. The method of claim 1 including altering the presentation using computer rendering.

4. The method of claim 1 including using eye gaze detection to determine what the user is looking at and altering the presentation of the region where the user's gaze has been detected.

5. The method of claim 4 including changing one or more of focus, illumination, or stereo correspondence in the region where the user's gaze has been detected.

6. The method of claim 5 including improving the appearance of the region that the user is looking at.

7. The method of claim 5 including degrading the appearance of the region that the user is looking at.

8. The method of claim 5 including using gaze detection technology to determine where the user is looking and adjusting the results of the gaze detection technology using video analysis.

9. The method of claim 4 including changing the presentation of the display in a region spaced away from the region the user is looking at in order to draw the user's attention to another region.

10. A non-transitory computer readable medium storing instructions executed by a computer to:
    make an initial assessment of where on a display a user is looking using gaze technology;
    test said initial assessment by determining whether the area the gaze detection technology indicates the user is looking at is blank;
    if the area is blank, search proximate to said area to determine if there is a proximate object; and
    if so, correct the initial assessment and identifying the proximate object as the object that the user is looking at and then altering resolution, depth of field or focus of that object.

11. The medium of claim 10 further storing instructions to use a plurality of stored depictions of the same scene taken with different imaging device settings.

12. The medium of claim 10 further storing instructions to use computer rendering to change the depiction of imaged objects on the computer display.

13. The medium of claim 10 further storing instructions to use eye gaze detection to determine what the user is looking at and to change the appearance of a region that is the target of the user's eye gaze.

14. The medium of claim 13 further storing instructions to change one or more of focus, illumination, or stereo correspondence in the region.

15. The medium of claim 14 further storing instructions to change the appearance of imaged objects spaced away from the region in order to draw the user's attention to the imaged objects.

16. The medium of claim 15 further storing instructions to improve the appearance of the region.

17. The medium of claim 16 further storing instructions to degrade the appearance of the region.

18. The medium of claim 10 further storing instructions to use gaze detection technology to determine where the user is looking and to adjust the results of the gaze detection technology using video analysis.

19. An apparatus comprising:
    a processor to make an initial assessment of where on a display a user is looking using gaze technology, test said initial assessment by determining whether the area the gaze detection technology indicates the user is looking at is blank, if the area is blank, search proximate to said area to determine if there is a proximate object, and, if so, correct the initial assessment and identify the proximate object as the object that the user is looking at and then alter resolution, depth of field or focus of that object; and
    an imaging device coupled to said computer display.

20. The apparatus of claim 19 including a computer display coupled to said processor.

21. The apparatus of claim 20 wherein said imaging device is mounted on said computer display.

22. The apparatus of claim 19 wherein said processor to alter the appearance of objects the user is looking at on the display.

23. The apparatus of claim 19 wherein said imaging device is a plenoptic camera.

24. The apparatus of claim 23, said camera to automatically capture a plurality of stored depictions of the same scene with different imaging device settings.

25. The apparatus of claim 19, said processor to change one or more of focus, illumination, or stereo correspondence in the region the user is looking at.

26. The apparatus of claim 25, said processor to change the appearance of imaged objects spaced away from what the user is looking at.

27. The apparatus of claim 26, said processor to improve the appearance of what the user is looking at.

28. The apparatus of claim 27, said processor to degrade the appearance of what the user is looking at.

\* \* \* \* \*